May 29, 1962     W. B. ANDERSON     3,036,400

SUBMERGIBLE FLOATING BAIT TANK

Filed April 7, 1959

INVENTOR
WILLIAM B. ANDERSON

BY

ATTORNEY.

United States Patent Office 3,036,400
Patented May 29, 1962

3,036,400
SUBMERGIBLE FLOATING BAIT TANK
William B. Anderson, 2089 Orange Ave.,
Costa Mesa, Calif.
Filed Apr. 7, 1959, Ser. No. 804,822
10 Claims. (Cl. 43—55)

This invention relates to bait tanks suitable for storing live bait and more particularly to a submergible floating bait tank adapted to be towed behind a fishing boat and incorporating various novel features including the ability to submerge automatically upon being towed forwardly thereby reducing resistance to movement and avoiding objectionable turbulence of surface water behind a boat.

Various proposals have been made heretofore for floating live bait tanks for storing the large quantity of bait of various sizes required in certain fishing practices and particularly by ocean fishing. In particular there have been proposals heretofore for generally cylindrical bait tanks with conical forward and rear ends and having an access opening along one side of the cylindrical body. However, these have been subject to various shortcomings and disadvantages sought to be eliminated by the present invention. Usually the conical ends comprise sealed air-filled compartments to impart the desired buoyancy with the bait access opening exposed above water level. Such tanks have required a keel lengthwise thereof and diametrically opposite the access opening. Not only does such a keel add to the storage space requirements for the tank when not in use, but it also adds considerably to the weight and cost of the tank. Of considerably greater importance is the fact that this type of tank design insures that the tank always floats partially exposed with the result that when being towed, it is subject to rather violent bumping and erratic motion caused by turbulent water conditions rearwardly of the towing boat. This not only adds considerably to the towing load, but is particularly objectionable because of the adverse affects upon the live bait in the tank.

These and other shortcomings of the prior art are fully avoided in the floating bait tank of the present invention which comprises an elongated bomb-shaped shell requiring no keel of any kind. Moreover, the buoyancy chambers heretofore restricted to the ends of the tank are shifted in the present design to lie along the upper side of the tank to either end of the bait access opening and are so disposed as to maintain the access opening alway, uppermost.

The automatic submersion of the present bait tank while being towed is accomplished by the simple expedient of providing water circulating openings at the opposite ends of the tank, these openings being so arranged and so proportioned relative to one another that water enters the forward end faster than it can exit at the rear. In consequence, the tank rapidly and automatically fills with water while being towed whereupon it submerges below turbulent surface water conditions so long as it is being towed. As towing speed decreases, the aforementioned buoyancy means causes the tank to rise to the surface as excess water exits through the various perforations to expose the access opening above water level.

Another feature of the bait tank is the use of a suitable non-metallic lightweight, plastic construction material resistant to shock and rough handling and immune to attack by water, salt and other contaminants. The midportion of the tank to either later side of the access opening is provided with a large number of water circulation perforations through which the water freely circulates when the tank is not being towed. During towing and in order to reduce excessive water circulation, the perforations in the central side wall portions of the tank are covered by a pair of curved doors hinged to the tank walls and effective when closed to substantially cut off all water circulation through these openings. Suitable lock means are provided for holding these covers closed while the tank is being towed. While removing bait, or while the tank is not being towed, these covers are preferably folded outwardly away from the tank so as not to interfere with the free circulation of water into and out of the tank.

Accordingly, it is a primary object of the present invention to provide an improved floating live bait tank obviating the above mentioned and other disadvantages of prior tanks.

Another object of the invention is the provision of a floating live bait tank which automatically submerges below turbulent surface water conditions while being towed and which automatically returns to expose its bait access opening above water level while not being towed.

Another object of the invention is the provision of an aerodynamically contoured shell adapted to float with a major portion thereof submerged and utilizing appropriately disposed buoyancy chambers to maintain its access opening above water level and to function in lieu of a keel in maintaining the tank in a desired orientation at all times and whether floating or submerged.

Another object of the invention is the provision of a floating live bait tank having a cylindrical main body portion and streamlined opposite ends and featuring water circulating openings along its opposite sides adapted to be substantially closed to limit circulation of water while the tank is being towed, but being free to admit circulating water when the tank is not being towed.

Another object of the invention is the provision of a submergible bait tank having deformable trim tabs on its tail fins arranged to facilitate submersion of the tank as the tank is being towed forwardly.

These and other more specific objects will appear upon reading the following specification and claims and upon considering in connection therewith the attached drawing to which they relate.

Referring now to the drawing in which a preferred embodiment of the invention is illustrated:

Figure 1:
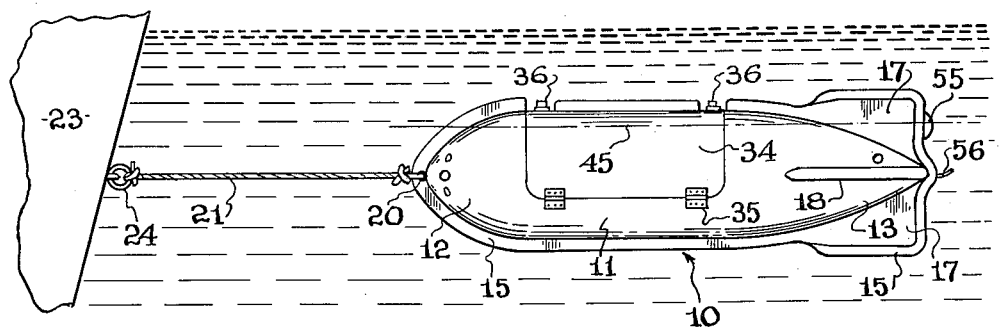
FIGURE 1 is a side elevational view of the live bait tank while being towed submerged below turbulent surface water conditions.

Referring now to FIGURES 1 to 4, there is shown a floating bait tank designated generally 10, having a main body shell 11. This shell preferably is formed from light-weight, non-metallic material highly resistant to shock, abrasion and attack by water, salt and other contaminants. Desirably, this material is moldable and includes a fabric-reinforced interior such as fiberglass, hemp, burlap or the like and a smooth polished exterior surface of resinous plastic. In a preferred construction, shell 11 is molded in similar halves split longitudinally, each half having an outwardly protruding narrow flange 15 the facing abutting surfaces of which may be coated with a suitable bonding agent or adhesive and pressed firmly together to form the finished tank. The completed aerodynamically contoured shell includes a cylindrical midportion and pointed leading and trailing ends 12 and 13. Trailing end 13 preferably has molded integral therewith a plurality of radially stabilizing fins including a vertical pair 17 and a horizontal pair 18. The interior of each of these fins may be and preferably is hollow thereby adding to the buoyancy of the tank. The foremost end of flanges 15 is provided with reinforced opening 20 to which a towing ring and tow rope 21 may be attached, the other end of the tow rope being suitably connected to towing vessel 23 such as by ring 24.

Figure 3:
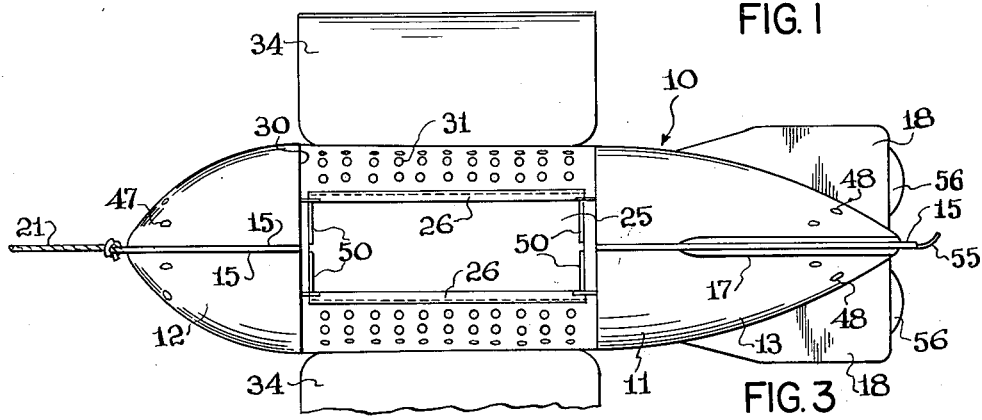
FIGURE 3 is a top plan view of the bait tank similar to FIGURE 2 and showing the water circulating covers open as they normally are while the tank is not being towed.
Figure 2:
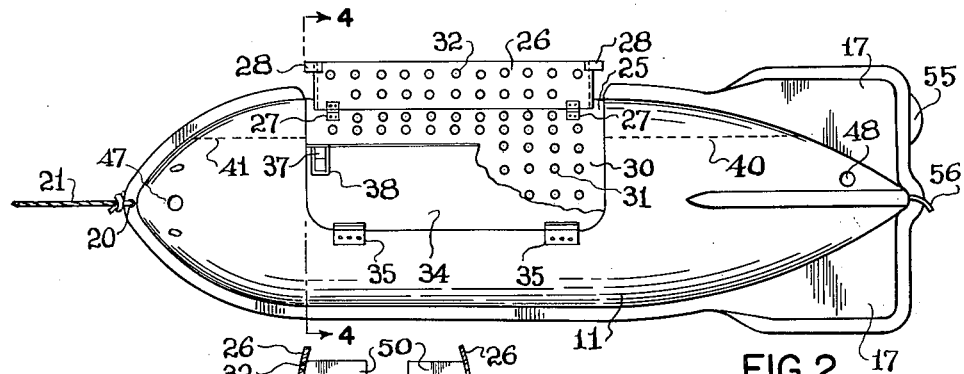
FIGURE 2 is a side elevational view of the tank on an enlarged scale, the access closure doors being shown in open position and the water circulation covers likewise being shown folded outwardly.
Figure 4:
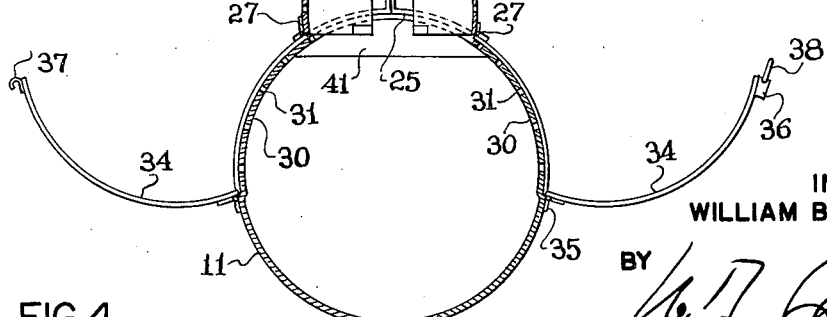
FIGURE 4 is a cross-sectional view taken along line 4—4 on FIGURE 2.

Referring now more particularly to FIGURES 2 and 3, it will be seen that the upper side wall of the tank midsection is provided with a rectangular bait access opening 25 here shown as closed by a pair of perforated doors 26 hinged to the lateral edges of the access opening, as by hinges 27. Stop tabs 28 secured to the inner end corners of doors 26 are engageable with rim edges of the access opening to prevent the hinging of doors 26 inwardly.

The cylindrical side walls of the tank laterally to either side of doors 26, 26 are depressed slightly below the surrounding exterior surface of the shell and this entire depressed area 30 is formed with a multiplicity of water circulating openings 31 similar to the circulating openings 32 in doors 26. Imperforate covers 34, 34 curved to correspond with the curvature of shell 11 have their lower longitudinal edges connected by hinges 35 to the lower edges of perforated areas 30. The adjacent lateral edges of covers 34 are fitted with toggle latches 36 and cooperating hooks 37 engageable with one another along the top center line of the tank to hold covers 34 locked snugly against the sides of the tank, it being understood that rings 38 of latches 36 are engageable in hooks 37 for this purpose.

An important feature of the described tank is the provision of contoured sponge rubber, styrofoam or the like material 40, 41 to the interior upper sides of shell 11 to either end of access opening 25. It is pointed out that buoyancy blocks 40, 41 are fluid-tight and provide ample buoyancy along the upper side of the tank to maintain access opening 25 a few inches above water level when the tank is not being towed. The water level under such conditions is indicated by dot and dash line 45 in FIGURE 1. Owing to the provision of the described buoyancy blocks 40, 41 in the upper portion of the tank, no keel is necessary for flotation, stabilizing or orientation purposes or to prevent spinning of the tank while being towed.

A further and highly important feature of the invention has reference to the provision of a series of openings 47 in the nose of the tank and another series of openings 48 in the trailing end of the tank. These openings cooperate to serve two purposes, namely, the circulation of water through the tank from end to end thereof while it is being towed, and secondly, to submerge the tank and maintain it submerged below turbulent surface waters so long as it is being towed. This latter function is achieved by making the total area of inlet openings 47 appreciably greater than the total area of outlet openings 48. In this connection some allowance must be made for the escape of some water from openings 31 in the midsection of the tank despite the fact that the closure of covers 34 substantially prevents circulation of water through openings 31. Because of the excess flow capacity of front openings 47 over that of outlet openings 48, forward movement of the tank results in the tank being completely filled with water except for the chambers occupied by buoyancy blocks 40, 41. However, the buoyancy of these taken with that of the tail fins 17, 18 is insufficient to maintain the tank on the surface and, while being towed, it remains submerged approximately to a depth of two to three feet below surface level where it is not subject to buffeting and where the quiet water permits efficient and substantially effortless towing of the tank.

As the towing boat slows, the excess water is forced from the various perforations by the buoyancy elements and the tank gradually rises until the water level is that indicated by dot and dash line 45 in FIGURE 1. This exposes the topmost portion of the tank and particularly the two sets of doors so that free access may be had to the interior of the tank. When the tank is not being towed, covers 34 are normally unlatched and swung outwardly to the position indicated in FIGURE 4. The interior closure doors 26 may then be opened upwardly and held in this position by the frictional contact of the end guard flanges 50, 50 secured thereto with their sides bearing frictionally against the adjacent edges of access opening 25.

The smooth and steady movement of the described bait tank, either at surface level or submerged, is due in large measure to the stabilizing and course control functions performed by deformable metal tabs secured in the rear edges of tail fins 17 and 18. Reference is had to a vertical trim tab 55 secured to the vertical fin 17 and protruding rearwardly therefrom in the manner shown in FIGURES 1, 2 and 3. This tab may be bent along a curve to the left or to the right and by an amount found best suited and most effective in causing the tank to remain upright and to tow with erratic sidewise twisting.

Trim tabs 56, 56 protruding from the rear edges of the two horizontal tail fins 18, 18 are curved downwardly and normally have a greater surface area than vertical tab 55. Tabs 56, 56 are most effective in causing the tank to submerge as towing speed increases and cooperate with the described water inlet holes 47 and outlet holes 48 to this end. However, it is pointed out that either holes 47 and 48 or trim tabs 56, 56 may be relied upon to effect submersion of the tank while being towed, although normally it is preferred to use the two features in mutual cooperation.

While the particular submergible floating bait tank herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A submergible bait tank for use by fishermen and adapted to be towed by a fishing boat, said tank comprising an elongated aerodynamically contoured closed shell having a tow line connector at its forward end and a plurality of radially disposed fins at its rear end, buoyancy means positioned intermediate the ends of said tank and adjacent the upper portion of its interior, said buoyancy means being effective to maintain said tank afloat with its upper side slightly exposed above water level when the tank is not being towed, said tank having water circulation perforations therethrough including perforations at the opposite ends of said tank, the total flow area of those perforations at the forward end being greater than the flow area of the perforations at the other end whereby upon being pulled through the water said tank becomes filled with water to a higher level and submerges and remains submerged until its forward speed decreases whereupon the tank rises to the surface of the water.

2. An elongated bait tank adapted to be towed behind a fishing boat and responsive to changes in towing speed to submerge and rise to water surface, said tank comprising a pointed shell provided with a plurality of radially disposed fins at its rear end, buoyancy means supported interiorly of the tank adjacent the upper side thereof and inwardly of its opposite ends, water circulating openings at the opposite ends of said tank, the openings at the forward end having a greater area than those at the other end whereby said tank fills with water to a higher level upon being towed and submerges but rises to the surface as towing ceases.

3. A bait tank as defined in claim 2 characterized in that said shell is formed in two halves of non-metallic material each having a rim, said halves each having a radially disposed flange along the rim thereof, and means securing said flanges together in a fluid-tight manner.

4. A floating bait tank adapted to be towed by a fishing boat and responsive to forward movement of the fishing boat to submerge and remain submerged so long as being towed, said tank being formed of thin non-metallic material and including fins projecting outwardly from the trailing end thereof, the central upper walls of said tank being perforated and including perforated hinged access closure members, a pair of imperforate covers closely overlying said perforated central area and including means normally holding the same closed, and additional perforations at the opposite ends of said tank effective to permit circulation of water longitudinally through said tank at an accelerated rate when said tank is being towed, the area of said last mentioned perforations at the forward end of said tank being greater than the area of the outlet openings at the trailing end of said tank.

5. A floating bait tank adapted to be towed behind a fishing boat, said tank being generally cylindrical with streamlined forward and trailing ends, radial fins projecting from the trailing end of said tank, a large area access opening centrally of the upper side of said tank, a plurality of water circulating openings along either side area of said tank laterally of said access opening, a pair of curved closure covers hinged to the opposite sides of said tank along the lower edges of said perforated areas and cooperable when pivoted toward one another to lie against the curved sides of said tank to cover said access opening and to substantially restrict the flow of water through said perforations, and means for securing said closure covers closed against the tank when the same is being towed.

6. A floating bait tank as defined in claim 5 characterized in the provision of buoyancy means on the interior of said tank lengthwise of its upper side and effective in maintaining the tank with said access opening uppermost irrespective of whether the tank is being towed submerged or with its access opening above water level.

7. A substantially keelless floating bait tank having a cylindrical main body with streamlined forward and trailing ends and having a through passage interiorly thereof, said tank having an access opening along one side of its cylindrical midsection, closure means for said opening, and buoyancy means secured to the upper wall portion of said tank to either end of said access opening and effective to maintain said tank with its access opening facing upwardly at all times, said tank being characterized by the provision of water inlet and outlet openings of differential areas at the opposite ends thereof, and so arranged that water can enter at a faster rate than it can exit during towing of said tank whereby, upon being towed, said tank becomes filled with water to a higher level and submerges, said tank rising to expose its said access opening as towing ceases.

8. A bait tank as defined in claim 7 characterized in the provision of stabilizing tail fins on the rear end thereof including at least one vertical fin and one horizontal fin, and deformable trim tab means secured to the rear edges of said vertical fin and bendable to different stable positions as necessary to stabilize said tank and cause the same to follow a straight course in an upright position while being towed through the water.

9. A bait tank as defined in claim 7 characterized in the provision of stabilizing tail fins on the rear end thereof including at least one vertical fin and one horizontal fin, and deformable trim tab means secured to the rear edges of said horizontal fins and deformable downwardly, said tabs being effective to cause said tank to submerge below the water surface automatically as an incident to the forward towing movement of the tank and to remain submerged so long as towing speed is maintained.

10. A bait tank as defined in claim 7 characterized in the provision of a plurality of stabilizing tail fins including vertical and horizontal fins, deformable metal trim tabs secured in the rear edges of a plurality of said fins, said tabs being bendable out of the plane of the supporting tail fins in a direction and in an amount found effective in promoting the stability of said tank while being towed and in causing the same to operate submerged below the water surface so long as being towed.

References Cited in the file of this patent

UNITED STATES PATENTS

| | | |
|---|---|---|
| 807,875 | Shinners | Dec. 19, 1905 |
| 1,188,583 | Townsend | June 27, 1916 |
| 2,027,069 | Sorenson | Jan. 7, 1936 |
| 2,302,206 | Gibson et al. | Nov. 17, 1942 |
| 2,560,733 | Morris | July 17, 1951 |
| 2,740,224 | Heiderich | Apr. 3, 1956 |
| 2,767,508 | Kiember | Oct. 23, 1956 |
| 2,834,145 | Kisiel | May 13, 1958 |